US 12,425,845 B2

(12) United States Patent
Ping et al.

(10) Patent No.: US 12,425,845 B2
(45) Date of Patent: Sep. 23, 2025

(54) SECURITY COMMUNICATION IN PROSE U2N RELAY

(71) Applicant: Nokia Technologies Oy, Espoo (FI)

(72) Inventors: Jing Ping, Chengdu (CN); Suresh Nair, Estero, FL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/576,625

(22) PCT Filed: May 7, 2022

(86) PCT No.: PCT/CN2022/091498
§ 371 (c)(1),
(2) Date: Jan. 4, 2024

(87) PCT Pub. No.: WO2023/216032
PCT Pub. Date: Nov. 16, 2023

(65) Prior Publication Data
US 2024/0314551 A1    Sep. 19, 2024

(51) Int. Cl.
G06F 17/00    (2019.01)
H04L 29/06    (2006.01)
H04W 12/03   (2021.01)
H04W 12/08   (2021.01)
H04W 40/22   (2009.01)

(52) U.S. Cl.
CPC ........... *H04W 12/03* (2021.01); *H04W 12/08* (2013.01); *H04W 40/22* (2013.01)

(58) Field of Classification Search
CPC .............................. H04W 12/03; H04W 40/22
USPC ............................................................. 726/1
See application file for complete search history.

(56) References Cited

U.S. PATENT DOCUMENTS

2021/0345104 A1* 11/2021 Cheng ............... H04W 12/0433
2022/0109996 A1*  4/2022 Lee ....................... H04W 76/14

FOREIGN PATENT DOCUMENTS

CN    113748619 A       12/2021
WO    2021/212260 A1   10/2021

OTHER PUBLICATIONS

"3rd Generation Partnership Project; Technical Specification Group Services and System Aspects; Security Aspects of Proximity based Services (ProSe) in the 5G System (5GS) (Release 17)", 3GPP TS 33.503, V0.3.0, Mar. 2022, pp. 1-42.
"IEEE 802.11", Wikipedia, Retrieved on Feb. 26, 2024, Webpage available at : https://en.wikipedia.org/wiki/IEEE_802.11.
(Continued)

*Primary Examiner* — Jeffrey C Pwu
*Assistant Examiner* — Samuel Ambaye
(74) *Attorney, Agent, or Firm* — Duft & Bornsen, PC

(57) ABSTRACT

Embodiments of the present disclosure relate to security communication in ProSe U2N relay. According to one aspect of the present disclosure, remote UE and relay UE receive a configuration comprising at least a set of indicators of a CP based security procedure or a UP based security procedure for a set of relay services. Based on an indicator for a relay service in the set of indicators, the remote UE and relay UE performs one of the CP based security procedure or the UP based security procedure for a communication between the remote UE and the relay UE for the relay service. In this way, remote UE and remote UE may correctly trigger a security procedure for U2N relay communication.

16 Claims, 7 Drawing Sheets

(56) References Cited

OTHER PUBLICATIONS

International Search Report and Written Opinion received for corresponding Patent Cooperation Treaty Application No. PCT/CN2022/091498, dated Dec. 16, 2022, 9 pages.
"ProSe: New Solution for Key Issue #3", 3GPP TSG-SA3 Meeting #104-e, S3-212967, Agenda: 5.9, Xiaomi, Aug. 16-27, 2021, 4 pages.
"3rd Generation Partnership Project; Technical Specification Group Services and System Aspects; Proximity based Services (ProSe) in the 5G System (5GS) (Release 17)", 3GPP TS 23.304, V17.3.0, Jun. 2022, pp. 1-105.

\* cited by examiner

SECURITY COMMUNICATION IN PROSE U2N RELAY

RELATED APPLICATION

This application was originally filed as PCT Application No. PCT/CN2022/091498, filed on May 7, 2022, each of which is incorporated herein by reference in its entirety.

FIELD

Embodiments of the present disclosure generally relate to the field of telecommunication and in particular, to a method, device, apparatus and computer readable storage medium for security communication in user equipment (UE)-to-network (U2N) relay for proximity based services (ProSe).

BACKGROUND

For ProSe communication via U2N relay, a user plane (UP) based security solution has been proposed in long term evolution (LTE) technologies. In the fifth generation (5G) communication technologies, as U2N relay will be used for commercial case besides public safety, a control plane (CP) based security solution has been proposed to ensure more solid and promised security. Currently, both UP and CP based security solutions will be supported for ProSe communication via U2N relay to authenticate remote UE and protect PC5 communication. However, workflow and functionality required for a CP based security solution is different from that required for a UP based security solution. Thus, effective management on CP and UP based security solutions is expected.

SUMMARY

In general, example embodiments of the present disclosure provide a solution for security communication in ProSe U2N relay.

In a first aspect, there is provided a first device. The first device comprises at least one processor; and at least one memory including computer program code; the at least one memory and the computer program code are configured to, with the at least one processor, cause the first device to: receive, from a third device, a first configuration comprising at least a set of indicators of a control plane based security procedure or a user plane based security procedure for a set of relay services; perform, based on the first configuration, a discovery procedure to determine a second device to relay a communication between the first device and a network for a relay service; and perform, based on an indicator for the relay service in the set of indicators, one of the control plane based security procedure and the user plane based security procedure for the communication between the first device and the second device for the relay service.

In a second aspect, there is provided a second device. The second device comprises at least one processor; and at least one memory including computer program code; the at least one memory and the computer program code are configured to, with the at least one processor, cause the second device to: receive, from a fourth device, a second configuration comprising at least a set of indicators of a control plane based security procedure or a user plane based security procedure for a set of relay services; and in response to receiving a communication request from a first device for a relay service, perform, based on an indicator for the relay service in the set of indicators, one of the control plane based security procedure or the user plane based security procedure for a communication between the first device and the second device for the relay service.

In a third aspect, there is provided a core network element. The core network element comprises at least one processor; and at least one memory including computer program code; the at least one memory and the computer program code are configured to, with the at least one processor, cause the core network element to: obtain, from a further core network element, a configuration comprising at least a set of indicators of a control plane based security procedure or a user plane based security procedure for a set of relay services; and transmit the configuration to the device.

In a fourth aspect, there is provided a method for communication. The method comprises: receiving, at a first device and from a third device, a first configuration comprising at least a set of indicators of a control plane based security procedure or a user plane based security procedure for a set of relay services; performing, based on the first configuration, a discovery procedure to determine a second device to relay a communication between the first device and a network for a relay service; and performing, based on an indicator for the relay service in the set of indicators, one of the control plane based security procedure and the user plane based security procedure for the communication between the first device and the second device for the relay service.

In a fifth aspect, there is provided a method for communication. The method comprises: receiving, at a second device and from a fourth device, a second configuration comprising at least a set of indicators of a control plane based security procedure or a user plane based security procedure for a set of relay services; and in response to receiving a communication request from a first device for a relay service, performing, based on an indicator for the relay service in the set of indicators, one of the control plane based security procedure or the user plane based security procedure for a communication between the first device and the second device for the relay service.

In a sixth aspect, there is provided a method for communication. The method comprises: obtaining, at a core network element and from a further core network element, a configuration comprising at least a set of indicators of a control plane based security procedure or a user plane based security procedure for a set of relay services; and transmitting the configuration to the device.

In a seventh aspect, there is provided an apparatus for communication. The apparatus comprises: means for receiving, at a first device and from a third device, a first configuration comprising at least a set of indicators of a control plane based security procedure or a user plane based security procedure for a set of relay services; means for performing, based on the first configuration, a discovery procedure to determine a second device to relay a communication between the first device and a network for a relay service; and means for performing, based on an indicator for the relay service in the set of indicators, one of the control plane based security procedure and the user plane based security procedure for the communication between the first device and the second device for the relay service.

In an eighth aspect, there is provided an apparatus for communication. The apparatus comprises: means for receiving, at a second device and from a fourth device, a second configuration comprising at least a set of indicators of a control plane based security procedure or a user plane based security procedure for a set of relay services; and means for performing, in response to receiving a communication request from a first device for a relay service and based on an indicator for the relay service in the set of indicators, one of the control plane based security procedure or the user plane based security procedure for a communication between the first device and the second device for the relay service.

In a ninth aspect, there is provided an apparatus for communication. The apparatus comprises: means for obtain, at a core network element and from a further core network element, a configuration comprising at least a set of indicators of a control plane based security procedure or a user plane based security procedure for a set of relay services; and means for transmitting the configuration to the device.

In a tenth aspect, there is provided a non-transitory computer readable medium comprising program instructions for causing an apparatus to perform the method according to the fourth or fifth or sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
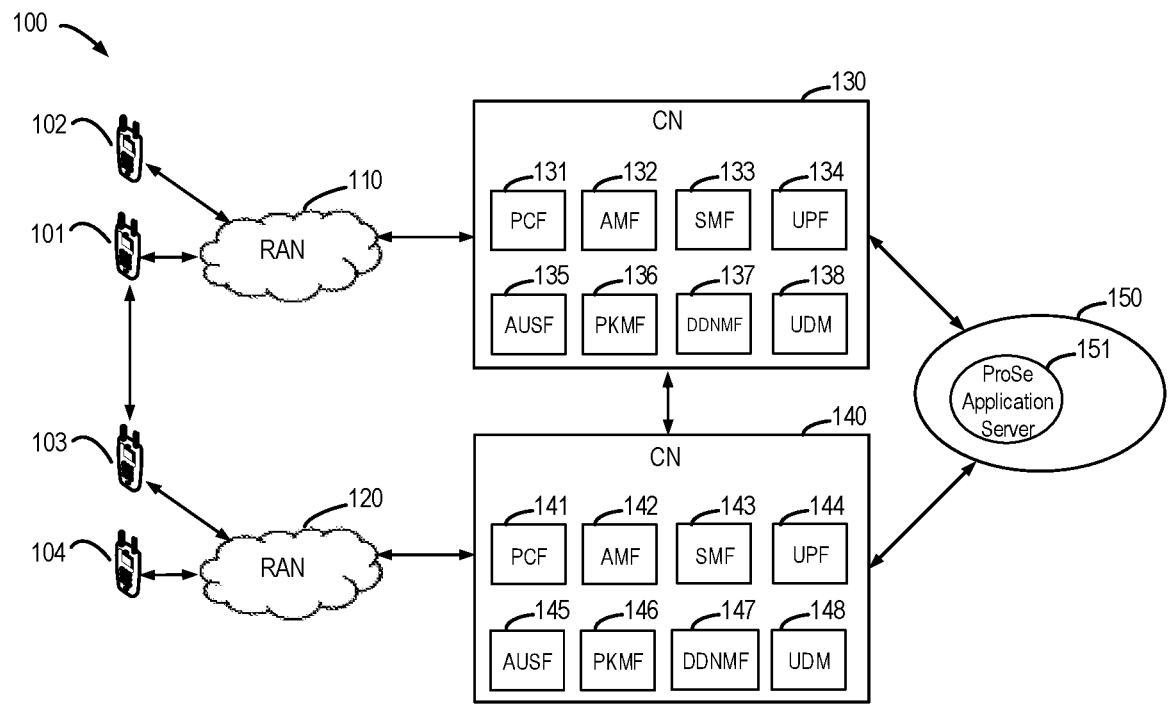
FIG. 1 illustrates an example communication environment in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the future sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" or "network element" refers to a node in a communication network via which a terminal device accesses the network and receives services therefrom. The communication network may be a core network (CN). The network device or element in CN (also referred to as core network element herein) may refer to a policy control function (PCF), an access management function (AMF), a session management function (SMF), a user plane function (UPF), unified data management (UDM), unified data repository (UDR), an authentication server function (AUSF), a ProSe key management function (PKMF), a direct discovery name management function (DDNMF), a network exposure function (NEF), etc.

The communication network may be a radio access network (RAN). The network device or element in RAN may refer to a base station (BS) or an access point (AP), for example, a node B (NodeB or NB), an evolved NodeB (eNodeB or eNB), a NR next generation NodeB (also referred to as a gNB), a Remote Radio Unit (RRU), a radio header (RH), a remote radio head (RRH), a relay, a low power node such as a femto, a pico, and so forth, depending on the applied terminology and technology. An radio access network (RAN) split architecture comprises a gNB-CU (centralized unit, hosting radio resource control (RRC), service data adaptation protocol (SDAP) and packet data convergence protocol (PDCP) layers) controlling a plurality of gNB-DUs (distributed unit, hosting radio link control (RLC), medium access control (MAC) and physical (PHY) layers).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

In the context of the present disclosure, the term "U2N relay" may be interchangeably used with "5G ProSe Layer-3 UE-to-Network Relay" or "relay UE". The term "remote UE" may be interchangeably used with "5G ProSe Layer-3 Remote UE".

As known, proximity based Services (ProSe) are services that can be provided by the third generation partnership project (3GPP) system based on UEs being in proximity to each other. The feature was introduced in LTE and evolved in 5G system (5GS). The 5GS enablers for ProSe include the following functions: 5G ProSe direct discovery; 5G ProSe direct communication; and 5G ProSe U2N relay.

PC5 is a reference point between ProSe-enabled UEs used for control and user planes for 5G ProSe direct discovery, 5G ProSe direct communication and 5G ProSe U2N relay. 5G ProSe direct discovery is defined as a process that detects and identifies another UE in proximity via new radio (NR) PC5 reference point. 5G ProSe direct discovery can be standalone or used for subsequent actions (e.g., to initiate 5G ProSe direct communication).

5G ProSe direct communication enables establishment of new communication paths between two or more ProSe-enabled UEs that are in communication range. 5G ProSe direct communication over PC5 reference point is supported when the UE is "served by NG-RAN" or when the UE is "not served by NG-RAN". 5G ProSe direct communication supports both cases of public safety and commercial service.

5G ProSe U2N relay feature enables 5G ProSe remote UE to connect to the 5G network via an 5G ProSe U2N relay. 5G ProSe Layer-2 or Layer-3 U2N relay entity provides a relaying functionality to support connectivity to the network for 5G ProSe remote UEs. It can be used for both public safety services and commercial services (e.g. interactive service).

When operating ProSe in both public safety and commercial cases, the 5GS shall be able to support regional or national regulatory requirements and ensure that the confidentiality and integrity of both user data and network signaling over a ProSe communication path to a level comparable with that provided by the existing 3GPP system.

Specially, the following security requirements apply to 5G ProSe U2N relay:

The 5GS shall support authentication and authorization of the UE as a 5G ProSe U2N relay and 5G ProSe remote UE in a 5G ProSe U2N relay scenario;

The 5GS shall support a secure means to establish a PC5 link between 5G ProSe remote UE and 5G ProSe U2N relay;

The 5GS shall support confidentiality protection, integrity protection and replay protection for secure communication between 5G ProSe remote UE and the 3GPP network via 5G ProSe U2N relays.

Accordingly, security solutions have been proposed to protect ProSe communications. For 5G ProSe communication via 5G ProSe U2N relay, there was a UP based security solution in LTE. In 5G, as a 5G ProSe U2N relay will be used for commercial case besides public safety, security risk surface will be expanded, and thus more solid and promised security solutions was desired. In this regard, a CP based security solution was introduced to authenticate 5G ProSe remote UE and generate keys to protect PC5 link between 5G ProSe remote UE and 5G ProSe U2N relay, which was based on primary authentication mechanism for UE and 5G network authentication.

In this case, both UP and CP based security solutions will be supported for 5G ProSe communication via 5G ProSe U2N relay in 5G. That means that 5G ProSe remote UE may support either UP or CP based security solution, or both of UP and CP based security solutions. Similarly, 5G ProSe U2N Relay may support either UP or CP based security solution, or both of UP and CP based security solutions.

As a workflow and functionality required for a CP based security solution is different from that required for a UP based security solution, the 5GS should enable 5G ProSe remote UE to discover and select the right 5G ProSe U2N relay which matches capability of the 5G ProSe remote UE and security policies for a corresponding relay service.

The 5G ProSe remote UE should have knowledge to decide which 5G ProSe U2N relay could be selected to support a CP based security solution for a relay service in discovery procedure, whether 5G ProSe Remote User Key (PRUK) derivation to support a CP based security solution should be triggered or not in a direct communication link establishment procedure, and what is the trigger of the key derivation. The 5G ProSe U2N relay should have knowledge to decide whether it can respond to a solicitation message from 5G ProSe remote UE during a discovery procedure and whether a CP or UP based security solution should be triggered during a direct communication link establishment procedure.

The required enabler and knowledge described above are not in existing solutions. Therefore, 5G ProSe remote UE cannot select the correct 5G ProSe U2N relay to support a CP based security solution during discovery. Neither remote UE nor U2N relay is capable to correctly trigger a CP based security workflow.

In view of this, embodiments of the present disclosure provide a solution of management on CP and UP based security solutions. In the solution, an indicator of a CP based security solution or a UP based security solution for a relay service is configured to remote UE and relay UE. Based on the indicator, remote UE may discover relay UE supporting the same security solution for the same relay service and trigger the corresponding security solution for protecting communication between the remote UE and relay UE for the relay service. Based on the indicator, relay UE may also trigger the corresponding security solution for protecting communication between the remote UE and relay UE for the relay service.

In this way, remote UE may select the correct relay UE to support the same security solution during discovery, and remote UE and relay UE is capable to correctly trigger a security solution workflow.

Principles and implementations of the present disclosure will be described in detail below with reference to the figures.

Example of Communication Environment

FIG. 1 illustrates a schematic diagram of an example communication environment 100 in which embodiments of the present disclosure can be implemented. As shown in FIG. 1, the communication environment 100 may involve a plurality of devices 101, 102, 103 and 104, a plurality of radio access networks (RANs) 110 and 120, a plurality of core networks (CNs) 130 and 140, and a data network 150.

In this example, the devices 101, 102, 103 and 104 are illustrated as mobile phones. It should be noted that any of the devices 101, 102, 103 and 104 may be any other suitable types of terminal devices or network devices. Further, it is to be understood that the number of the devices is only for the purpose of illustration without suggesting any limitations. The communication environment 100 may include any suitable number or type of the devices adapted for implementing embodiments of the present disclosure.

As shown in FIG. 1, the CN 130 may comprise a plurality of CN elements, for example, a PCF 131, an AMF 132, a SMF 133, a UPF 134, an AUSF 135, a PKMF 136, a DDNMF 137 and a UDM 138. The CN 140 may comprise a plurality of CN elements, for example, a PCF 141, an AMF 142, a SMF 143, a UPF 144, an AUSF 145, a PKMF 146, a DDNMF 147 and a UDM 148 as shown in FIG. 1. It is to be understood that the CN elements in CNs 130 and 140 are only for the purpose of illustration without suggesting any limitations. The communication environment 100 may include more or less CN elements adapted for implementing embodiments of the present disclosure.

The data network 150 may be Internet or any other suitable data networks. The data network 150 may comprise a ProSe application server 151. The RANs 110 and 120 may comprise any suitable network devices (not shown) and may adopt any suitable RAN technologies. It is to be understood that the communication environment 100 may include any suitable number or type of the RANs, CNs and data networks adapted for implementing embodiments of the present disclosure.

In some embodiments, the devices 101 and 102 may communicate with the data network 150 via the RAN 110 and the CN 130. The devices 103 and 104 may communicate with the data network 150 via the RAN 120 and the CN 140.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G) or the future sixth generation (6G) wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In some embodiments for U2N relay communication, the device 101 may communicate with the RAN 110 via another device in the same RAN, for example, the device 102. In this case, the device 101 may communicate with the data network 150 via the device 102, the RAN 110 and the CN 130. In these embodiments, the device 101 may serve as remote UE, and the device 102 may serve as relay UE.

In some embodiments for U2N relay communication, the device 101 may communicate with another RAN (for example, the RAN 120) via another device in the other RAN, for example, the device 103. In this case, the device 101 may communicate with the data network 150 via the device 103, the RAN 120 and the CN 140. In these embodiments, the device 101 may serve as remote UE, and the device 103 may serve as relay UE.

The remote UE and the relay UE may communicate with each other via a sidelink interface (for example, a PC5 link). For example, the remote UE and the relay UE may communicate with each other via a sidelink data channel such as a physical sidelink shared channel (PSSCH), a sidelink control channel such as a physical sidelink control channel (PSCCH) or a physical sidelink feedback channel (PSFCH), or any other existing or future sidelink channels.

Figure 2:
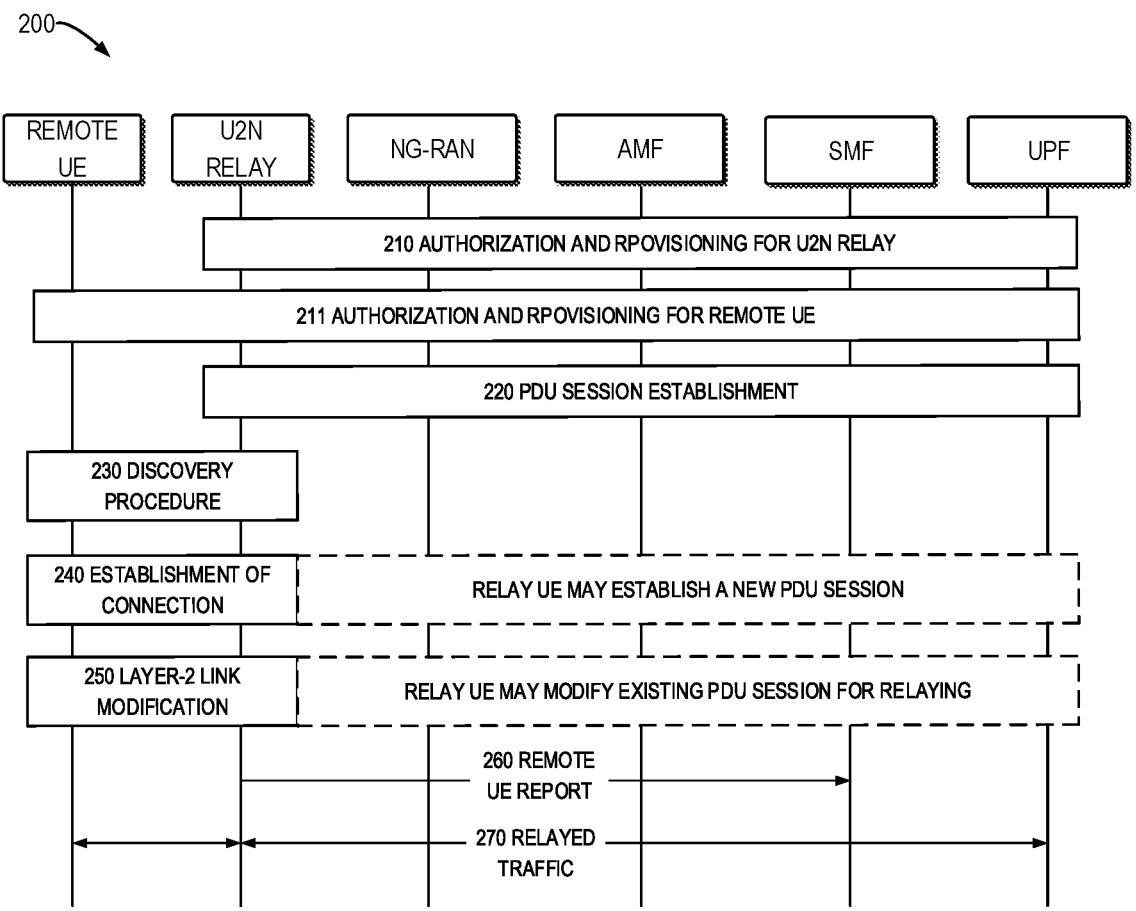
FIG. 2 illustrates a diagram illustrating a process of ProSe communication via U2N relay in which embodiments of the present disclosure may be implemented.

FIG. 2 illustrates a diagram illustrating a process 200 of ProSe communication via U2N relay in which embodiments of the present disclosure may be implemented. It is to be understood that an order of steps in the process is merely for illustration, and is not intended for limitation.

As shown in FIG. 2, at step 210, service authorization and provisioning are performed for U2N relay. At step 211, service authorization and provisioning are performed for remote UE. At step 220, the U2N relay may establish a protocol data unit (PDU) session for relaying.

At step 230, the remote UE performs discovery procedure to discover a U2N relay. As part of the discovery procedure, the remote UE learns about a connectivity service the U2N relay provides.

At step 240, the remote UE selects a U2N relay based on connectivity service the U2N relay can provide and establishes a connection for unicast mode communication. The selected U2N relay may establish a new PDU session.

At step 250, the selected U2N relay may generate packet filters used over Uu interface based on received PC5 quality of service (QoS) information and QoS Rule(s) in Layer-2 link modification procedure, and may perform UE requested PDU session modification to setup a new QoS flow or bind traffic to an existing QoS flow. From this point, uplink and downlink relaying may start.

At step 260, the selected U2N relay may transmit a remote UE report message to SMF for a PDU Session associated with the relay. The remote UE report message may comprise a remote UE identity (ID) and remote UE information.

At step 270, relayed traffic may be performed between the remote UE and a network via the selected U2N relay.

Figure 3:
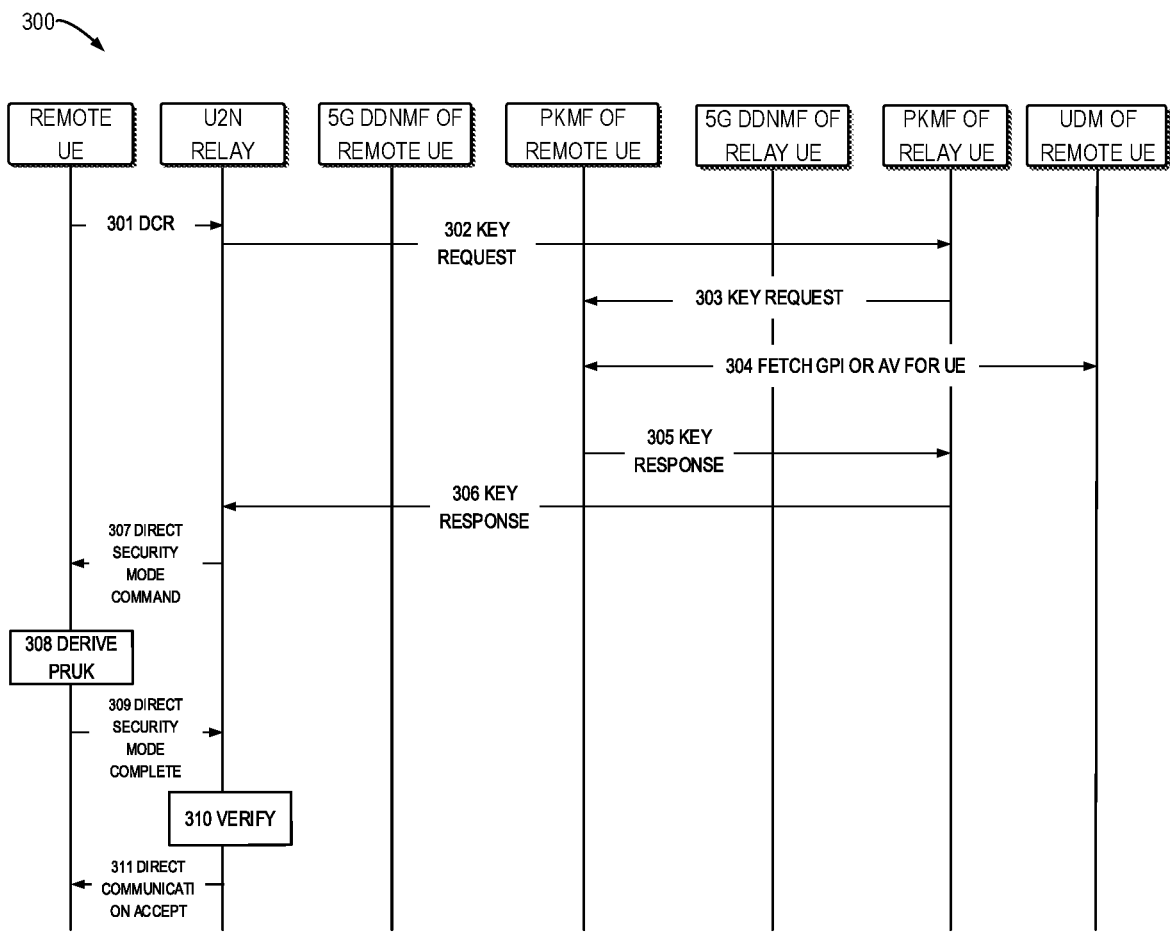
FIG. 3 illustrates a diagram illustrating a process of a UP based security solution in which embodiments of the present disclosure may be implemented.

For ProSe communication via U2N relay, a UP based security solution is proposed. FIG. 3 illustrates a diagram illustrating a process 300 of a UP based security solution in which embodiments of the present disclosure may be implemented. It is to be understood that an order and implementation of steps in the process is merely for illustration, and is not intended for limitation.

As shown in FIG. 3, at step 301, remote UE may transmit, to U2N relay, a direct communication request (DCR) that comprises a PRUK ID or a subscription concealed identifier (SUCI), relay service code (RSC) of a relay service and $K_{NRP}$ freshness parameter 1. At step 302, U2N relay may transmit a key request message that comprises PRUK ID/SUCI, RSC and $K_{NRP}$ freshness parameter 1 to PKMF of the U2N relay.

At step 303, upon reception of the key request message, the PKMF of the U2N relay may check if the U2N relay is authorized to provide the relay service to the remote UE based on the U2N relay's ID associated with the key used to establish secure PC5 connection. If the U2N relay's authorization information is not locally available, the PKMF of the U2N relay may request the authorization information from UDM of U2N relay. If the U2N relay is authorized to provide the relay service based on ProSe Subscription data, the PKMF of the U2N relay may transmit the key request with a PRUK ID or SUCI to the PKMF of the Remote UE.

At step 304, upon reception of the key request message, the PKMF of the remote UE may check if the remote UE is authorized to use the relay service. If the remote UE's authorization information is not locally available, the PKMF of the remote UE may request the authorization information from UDM of remote UE.

At step 305, the PKMF of the remote UE may generate $K_{NRP}$ freshness parameter 2 and derive $K_{NRP}$ using a PRUK identified by the PRUK ID, RSC, $K_{NRP}$ freshness parameter 1 and $K_{NRP}$ freshness parameter 2. Then the PKMF of the remote UE may transmit, to the PKMF of the U2N relay, a key response message that comprises $K_{NRP}$ and $K_{NRP}$ freshness parameter 2.

At step 306, the PKMF of the U2N relay may transmit a key response message to the U2N relay. At step 307, the U2N relay may derive a session key ($K_{NRP-SESS}$) from $K_{NRP}$ and then derive a confidentiality key (NRPEK) and an integrity key (NRPIK). The U2N relay may transmit a direct security mode command message to the remote UE.

At step 308, if the remote UE receives the message comprising generic bootstrapping architecture (GBA) push information (GPI), the remote UE may derive the PRUK and obtain PRUK ID from the GPI. The Remote UE may derive $K_{NRP}$ from its PRUK, RSC, $K_{NRP}$ Freshness Parameter 1 and the received $K_{NRP}$ Freshness Parameter 2. It shall then derive the session key ($K_{NRP-SESS}$) in the same manner as the 5G ProSe UE-to-Network Relay and process the Direct Security Mode Command. Successful verification of the Direct Security Mode Command assures the Remote UE that the U2N relay is authorized to provide the relay service.

At step 309, the remote UE may respond with a direct security mode complete message to the U2N relay. At step 310, the U2N relay may verify the direct security mode complete message. At step 311, the U2N relay may respond with a direct communication accept message to the remote UE after the successful verification to finish the PC5 connection establishment procedures. Then, the remote UE and the U2N relay may continue the rest of procedure for the relay service over the secure PC5 link.

Figure 4:
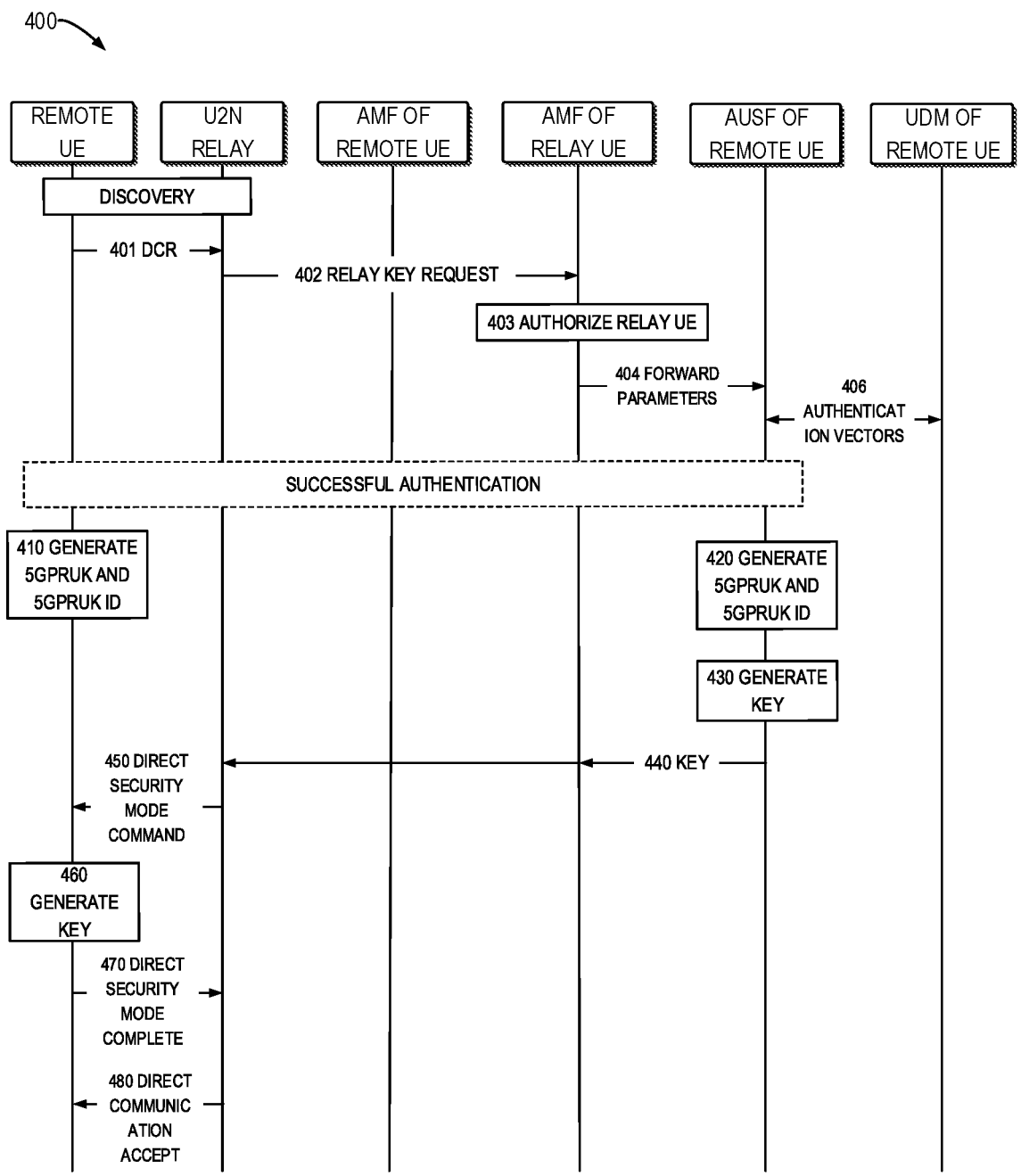
FIG. 4 illustrates a diagram illustrating a process of a CP based security solution in which embodiments of the present disclosure may be implemented.

For ProSe communication via U2N relay, a CP based security solution is also proposed. FIG. 4 illustrates a diagram illustrating a process 400 of a CP based security solution in which embodiments of the present disclosure may be implemented. It is to be understood that an order and implementation of steps in the process is merely for illustration, and is not intended for limitation.

As shown in FIG. 4, after a discovery of a U2N relay, at step 401, the remote UE may transmit a Direct Communication Request to the 5G ProSe UE-to-Network Relay for establishing secure PC5 unicast link. The Remote UE may include its security capabilities and PC5 security signaling policy in the DCR message. The message may also include SUCI, Relay Service Code, Nonce_1.

At step 402, upon reception of the DCR message, the U2N relay may transmit the Relay Key Request to the AMF of the U2N relay, including partial parameters received in the DCR message. The U2N relay may also include in the message a transaction identifier that identifies the Remote UE for the subsequent messages over U2N relay's NAS messages and PC5 messages.

At step 403, the AMF of the U2N relay may verify whether the U2N relay is authorized to provide the U2N relay service.

At step 404, the AMF of the U2N relay may select an AUSF based on SUCI and forward the parameters received in Relay Key Request to the AUSF in Nausf_UEAuthentication_ProseAuthenticate Request message. The Nausf_UEAuthentication_ProseAuthenticate Request message may contain the Remote UE's SUCI, Relay Service Code, Nonce_1. The AUSF may initiate a 5G ProSe Remote UE specific authentication using the ProSe specific parameters received (i.e., RSC, etc.). Security policy negotiation and protection of messages may follow one-to-one security establishment.

At step 405, the AUSF of the remote UE may retrieve the Authentication Vectors from the UDM of the remote UE via Nudm_UEAuthentication_GetProseAv Request message and trigger authentication of the 5G ProSe Remote UE. This authentication is performed between the AUSF of the remote UE and the remote UE via the AMF of the U2N relay and the U2N relay. Based on a subscription permanent identifier (SUPI), the UDM of the remote UE may choose an authentication method.

At step 410, upon successful authentication, remote UE may generate 5GPRUK and 5GPRUK ID using newly derived $K_{AUSF\_P}$. At step 420, upon successful authentication, AUSF of remote UE may also generate 5GPRUK and 5GPRUK ID using newly derived $K_{AUSF\_P}$.

At step 430, the AUSF of the remote UE may generate a key $K_{NR\_ProSe}$. At step 440, the AUSF of the remote UE may transmit the key $K_{NR\_ProSe}$ to U2N relay via AMF of U2N relay. At step 450, the U2N relay may transmit a direct security mode command message to the remote UE.

At step 460, the remote UE may generate the key $K_{NR\_ProSe}$. At step 470, the remote UE may transmit a direct security complete message to the U2N relay. At step 480, the U2N relay may respond a direct communication accept message to the remote UE. Then, the remote UE and the U2N relay may continue the rest of procedure for the relay service over the secure PC5 link.

Embodiments of the present disclosure provide a solution of managing CP and UP based security procedures. More details will be described below in connection with FIG. 5.

Example Implementation of Management of UP and CP Based Security Solutions

Figure 5:
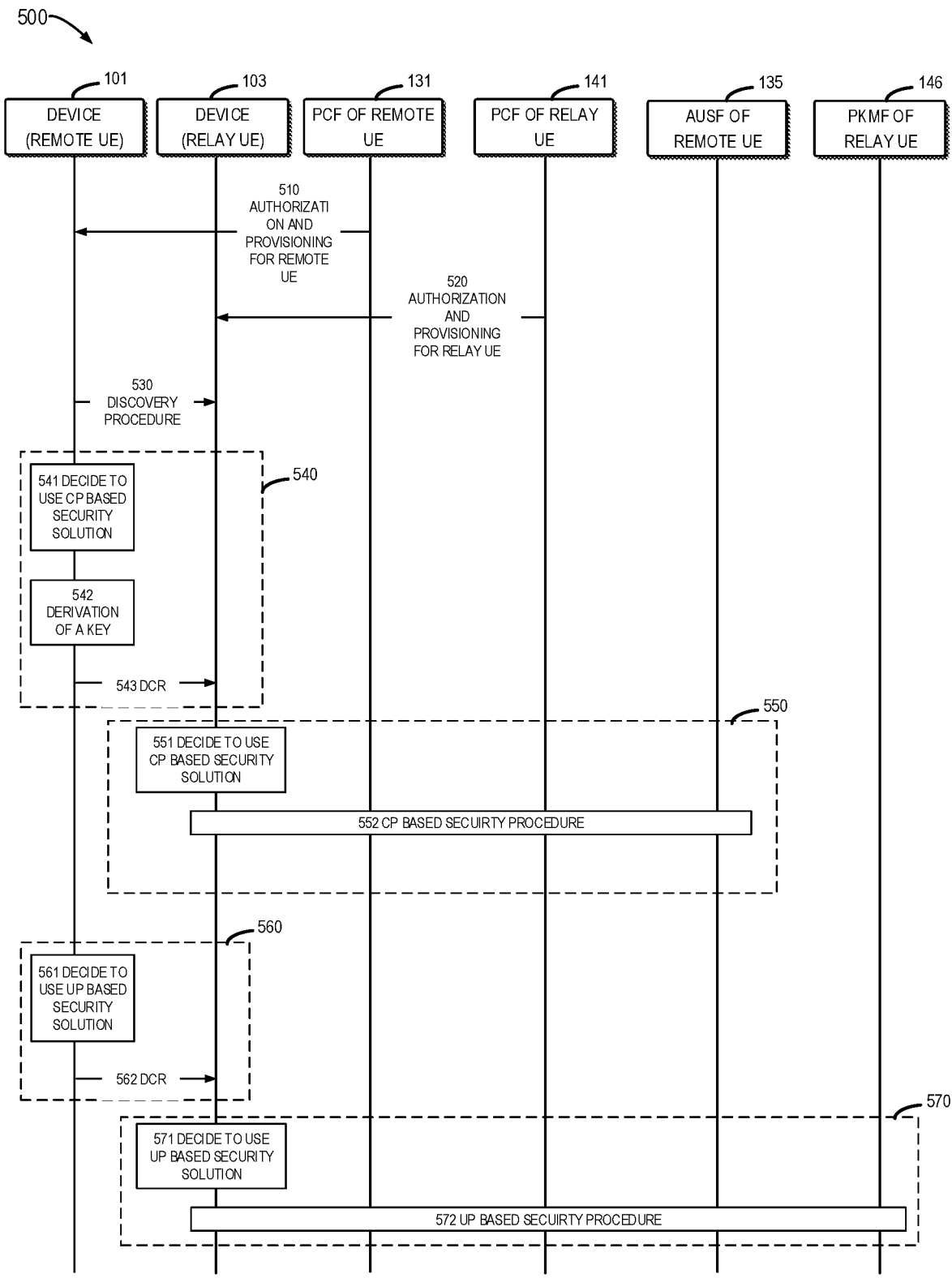
FIG. 5 illustrates a diagram illustrating a process of communication according to some embodiments of the present disclosure.

FIG. 5 illustrates a flowchart illustrating a process 500 of communication according to some embodiments of the present disclosure. For the purpose of discussion, the process 500 will be described with reference to FIG. 1. It is to be understood that an order and implementation of steps in the process is merely for illustration, and is not intended for limitation.

For illustration, it is assumed that the device 101 serves as remote UE and the device 103 serves as relay UE. Further, the process 500 will be described by taking the PCF 131 as an example of a third device serving the device 101 and the PCF 141 as an example of a fourth device serving the device 103.

In some embodiments, the third device may be a core network element. For example, the third device may be a PCF of remote UE. In another example, the third device may be a PKMF of remote UE. It is to be understood that any other suitable core network elements are also feasible. In some alternative embodiments, the third device may be a ProSe application server.

In some embodiments, the fourth device may be a core network element. For example, the fourth device may be a PCF of relay UE. In another example, the fourth device may be a PKMF of relay UE. It is to be understood that any other suitable core network elements are also feasible. In some alternative embodiments, the fourth device may be a ProSe application server.

As shown in FIG. 5, at step 510, a third device (e.g., the PCF 131) serving the device 101 transmits, to the device 101, a configuration (for convenience, also referred to as a first configuration herein) comprising a set of indicators of a CP based security procedure or a UP based security procedure for a set of relay services.

In some embodiments, the PCF 131 may obtain the configuration from a further core network element. In some embodiments, the further core network element may be UDM. In some embodiments, the further core network element may be UDR. It is to be understood that the further core network element may be any other suitable core network elements, and the present application does not limit this aspect.

In some embodiments, the configuration may comprise an indicator of a CP based security procedure or a UP based security procedure for each relay service. For example, the PCF 131 may add an indicator in security related content for 5G ProSe U2N relay discovery for each ProSe RSC based on security policies of a relay service associated with the RSC.

For example, the indicator may comprise a first indicator (also referred to as a CP based security indicator herein) indicating a CP based security procedure and a second indicator (also referred to as a UP based security indicator herein) indicating a UP based security procedure. In another example, the indicator may only comprise the first indicator indicating the CP based security procedure. The absence of the first indicator may be used to indicate the UP based security procedure. In still another example, the indicator may only comprise the second indicator indicating the UP based security procedure. The absence of the second indicator may be used to indicate the CP based security procedure. In yet another example, the indicator may comprise a single indicator indicating both of the CP and UP based security procedures. For example, a first value of the single indicator indicates the CP based security procedure, and a second value of the single indicator indicates the UP based security procedure. For example, the first value is 0 and the second value is 1. As another example, the first value is 1 and the second value is 0. It is to be understood that the indicator may be implemented in any suitable ways and the present disclosure does not limit this aspect.

In some embodiments, the first configuration may also comprise an indication indicating whether the at least one of the CP based security procedure and the UP based security procedure is authorized for the device 101. For example, the PCF 131 may provision the device 101 with the indication based on security capability of the device 101 and security/authorization policies in the subscription data. In some embodiments for the security capability of the device 101, the device 101 may be preconfigured with both of CP based security and UP based security supporting capabilities. In some embodiments, the device 101 may be preconfigured with one of CP based security and UP based security supporting capabilities. In some embodiments, the device 101 may be preconfigured with none of CP based security and UP based security supporting capabilities.

It is to be understood that the indication may be implemented by any suitable configuration parameters and the present disclosure does not limit this aspect. It is also to be understood that the first configuration may also comprise any other suitable information existing or to be developed. With the step 510, authorization and provisioning for remote UE is accomplished.

At step 520, a fourth device (e.g., the PCF 141) serving the device 103 transmits, to the device 103, a configuration (for convenience, also referred to as a second configuration herein) comprising a set of indicators of a CP based security procedure or a UP based security procedure for a set of relay services. For example, the PCF 141 may add an indicator in security related content for 5G ProSe U2N relay discovery for each ProSe RSC based on security policies of a relay service associated with the RSC.

For example, the indicator may comprise a first indicator (also referred to as a CP based security indicator herein) indicating a CP based security procedure and a second indicator (also referred to as a UP based security indicator herein) indicating a UP based security procedure. In another example, the indicator may only comprise the first indicator indicating the CP based security procedure. The absence of the first indicator may be used to indicate the UP based security procedure. In still another example, the indicator may only comprise the second indicator indicating the UP based security procedure. The absence of the second indicator may be used to indicate the CP based security procedure. In yet another example, the indicator may comprise a single indicator indicating both of the CP and UP based security procedures. For example, a first value of the single indicator indicates the CP based security procedure, and a second value of the single indicator indicates the UP based security procedure. For example, the first value is 0 and the second value is 1. As another example, the first value is 1 and the second value is 0. It is to be understood that the indicator may be implemented in any suitable ways and the present disclosure does not limit this aspect.

In some embodiments, the second configuration may also comprise an indication indicating whether the at least one of the CP based security procedure and the UP based security procedure is authorized for the device 103. For example, the PCF 141 may provision the device 103 with the indication based on security capability of the device 103 and security/authorization policies in the subscription data. In some embodiments for the security capability of the device 103, the device 103 may be preconfigured with both of CP based security and UP based security supporting capabilities. In some embodiments, the device 103 may be preconfigured with one of CP based security and UP based security supporting capabilities. In some embodiments, the device 103 may be preconfigured with none of CP based security and UP based security supporting capabilities.

It is to be understood that the indication may be implemented by any suitable configuration parameters and the present disclosure does not limit this aspect. It is also to be understood that the second configuration may also comprise any other suitable information existing or to be developed. With the step 520, authorization and provisioning for relay UE is accomplished.

At step 530, the device 101 performs a discovery procedure for a relay service based on the first configuration. In some embodiments, the device 101 may determine, based on at least the set of indicators and the indication of authorization comprised in the first configuration, a relay device to relay a communication between the device 101 and a network for the relay service. It is to be understood that this is merely an example, and any other suitable ways are also feasible. The present disclosure does not limit this aspect.

For example, a RSC may be used in the discovery procedure to indicate a connectivity service that a relay UE provides to the device 101 (i.e., remote UE). A list of RSCs may be configured on relay UE and the device 101. The relay UE and the device 101 are aware of whether a RSC is supporting CP or UP based security according to security related content associated to the RSC. The device 101 may monitor announcement or discovery response messages with the RSC corresponding to the desired relay service. Then, the device 101 may select a relay UE based on received information to relay a communication between the device 101 and a network (for example, the RAN 120, the CN 140 or the data network 150) for the relay service. For example, the device 103 is selected as the relay UE.

In some embodiments, the CP or UP based security indicator may be added as an additional parameter used in a relay discovery additional information message (for Model A) for U2N relay to announce during the discovery procedure. Then after monitoring the announcing message, the device 101 (i.e., remote UE) may select the U2N relay based on RSC and the CP or UP based security indicator.

Then the device 101 performs one of the CP based security procedure and the UP based security procedure based on an indicator for the relay service in the set of indicators. In some embodiments, the device 101 may determine a CP based security procedure or a UP based security procedure based on the indicator. In other words, the device 101 may determine one of the CP based security procedure and the UP based security procedure that corresponds to a RSC of the relay service. Then the device 101 may trigger the determined security procedure for communication of the relay service via the device 103.

In some embodiments, security related content of the relay service associated to the RSC discovered in discovery procedure may comprise a CP based security indicator. In these embodiments, as shown in step 540, the device 101 may perform the CP based security procedure based on the CP based security indicator. For example, as shown in step 541, the device 101 (i.e., the remote UE) may decide to use a CP based security solution. At step 542, the device 101 may trigger derivation of a key (5GPRUK). At step 543, the device 101 may transmit a direct communication request (DCR) to the device 103 (i.e., the discovered and selected U2N relay with RSC). The DCR may comprise a 5GPRUK ID/SUCI and RSC of the relay service.

Upon reception of the DCR, at step 550, the device 103 may perform one of a CP based security procedure or a UP based security procedure based on the indicator comprised in the second configuration. In other words, the device 103 may determine one of the CP based security procedure and the UP based security procedure that corresponds to a RSC of the relay service. Then the device 103 may trigger the determined security procedure for communication of the relay service via the device 103.

For example, at step 551, the device 103 may decide to use a CP based security procedure. At step 552, the device 103 may trigger a CP based security procedure towards AUSF 135 of the device 101 via AMF 142 of the device 103, according to a CP based security indicator in security related content of the relay service associated to the RSC. For example, upon reception of the DCR, based on a CP based security indicator of the RSC, the device 103 may send a relay key request to an AMF of the device 103. The AMF should support single network slice selection assistance information (S-SNSSAI) associated with the RSC, hence support CP based security. Other details of the CP based security procedure may be similar to that described in connection with FIG. 4 and thus are omitted here for brevity. It is to be understood that the CP based security procedure may also be implemented in any other suitable ways, and the present disclosure does not limit this aspect.

In some alternative embodiments, security related content of the relay service associated to the RSC discovered in discovery procedure may comprise a UP based security indicator. In these embodiments, as shown in step 560, the device 101 may perform the UP based security procedure based on the indicator. For example, at step 561, the device 101 (i.e., the remote UE) may decide to use a UP based security solution. At step 562, the device 101 may transmit a DCR to the device 103 (i.e., the discovered and selected U2N relay with RSC). The DCR may comprise a PRUK ID/SUCI, RSC of the relay service and $K_{NRP}$ freshness parameter 1.

Upon reception of the DCR, at step 570, the device 103 may perform a UP based security procedure based on the indicator comprised in the second configuration. For example, at step 571, the device 103 may decide to use a UP based security procedure. At step 572, the device 103 may trigger a UP based security procedure towards PKMF 146 of the device 103. Other details of a UP based security procedure may be similar to that described in connection with FIG. 3 and thus are omitted here for brevity. It is to be understood that the UP based security procedure may also be implemented in any other suitable ways, and the present disclosure does not limit this aspect.

With the process 500, remote UE may select correct relay UE to support the same security solution during discovery, and remote UE and relay UE is capable to correctly trigger a security solution workflow. Thus, a ProSe U2N relay communication may be achieved in a more reliable and effective way.

According to embodiments of the present disclosure, security requirements may be added to indicate the following contents:

The configuration parameter to indicate whether CP and/or UP based security is supported by 5G ProSe UE-to-Network Relay shall be provisioned by PCF.

The configuration parameter to indicate whether CP and/or UP based security is supported by 5G ProSe Remote UE shall be provisioned by PCF.

The CP or UP based security indicator in security related content shall be configured per 5G ProSe UE-to-Network Relay service by PCF based on the security policies of the specific relay service.

The 5G ProSe remote UE shall be able to discovery discover 5G ProSe Relay to support CP based security.

The 5G ProSe remote UE shall be able to discovery discover 5G ProSe Relay to support UP based security.

The 5G ProSe remote UE and Relay shall decide either control plane or user plane based security for 5G ProSe Layer-3 UE-to-Network Relay according to security related content of specific relay service.

Logic of the PCF, the 5G ProSe remote UE and 5G ProSe UE-to-Network relay should be enhanced to support the feature.

The AMF and AUSF could be implicitly impacted as extension of RSC.

For AF-based service parameter provisioning for 5G ProSe communications case, in addition, the UDR could be implicitly impacted as extension of RSC, and the UDM could be implicitly impacted as extension of subscription data. Also ProSe Application Server needs to be enhanced.

As to policy or parameter provisioning for 5G ProSe U2N relay, the following contents may be specified:

add authorized CP and/or UP based security parameter for ProSe L3 U2N relay/remote UE provisioning.

add CP or UP based security indicator in security related content of a relay service.

Example Implementation of Methods

Figure 6:
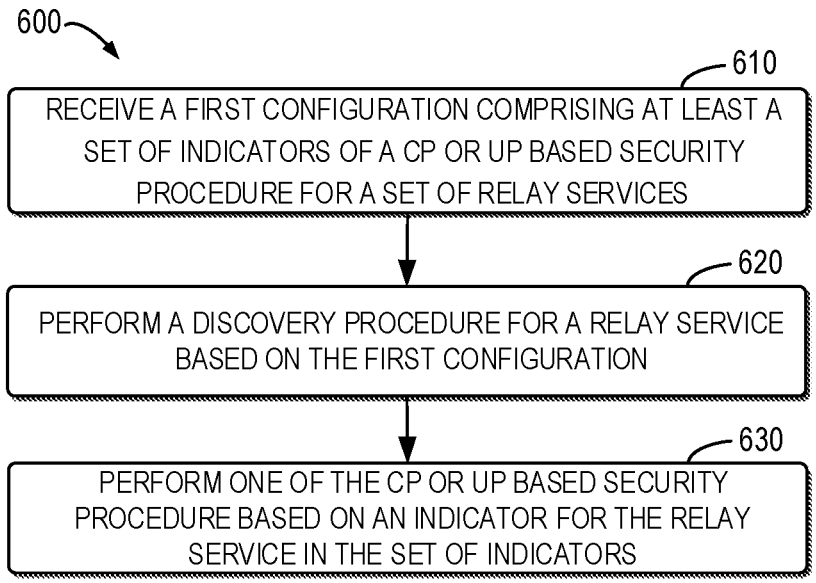
FIG. 6 illustrates a flowchart of an example method implemented at a first device as remote UE according to some embodiments of the present disclosure.

Corresponding to the above process, example embodiments of the present disclosure also provide methods of communication. FIG. 6 illustrates a flowchart of an example method 600 implemented at a first device as a remote UE according to some embodiments of the present disclosure. For the purpose of discussion, the method 600 will be described with reference to FIG. 1. It is assumed that the device 101 is remote UE and the device 103 is relay UE.

At block 610, a first device (e.g., the device 101) receives, from a third device (e.g., the PCF 131 serving the device 101), a first configuration comprising at least a set of indicators of a CP based security procedure or a UP based security procedure for a set of relay services.

In some embodiments, the first configuration may further comprise an indication indicating whether the at least one of the CP based security procedure and the UP based security procedure is authorized for the device 101.

In some embodiments, the third device may be a core network element. In some embodiments, the third device may be a PCF for the device 101. In some embodiments, the third device may be a PKMF for the device 101. In some embodiments, the third device may be a ProSe application server.

At block 620, the device 101 performs, based on the first configuration, a discovery procedure to determine a second device (i.e., relay UE) to relay a communication between the device 101 and a network for a relay service. In some embodiments, the device 101 may determine the relay UE (e.g., the device 103) based on at least the set of indicators and the indication. For example, in addition to the set of indicators and the indication, the device 101 may also use other capabilities of remote UE and properties of the target relay service identified by a RSC to perform the discovery procedure. The present disclosure does not limit this aspect.

At block 630, the device 101 performs, based on an indicator for the relay service in the set of indicators, one of the CP based security procedure and the UP based security procedure for the communication between the device 101 and the device 103 for the relay service.

In some embodiments, the device 101 may determine the one of the control plane based security procedure and the user plane based security procedure based on the indicator, and trigger the one of the control plane based security procedure and the user plane based security procedure.

With the method 600, an indicator of a CP based security procedure or a UP based security procedure for a relay service may be configured to remote UE. Based on the indicator, remote UE may correctly trigger a security procedure for U2N relay communication.

Figure 7:
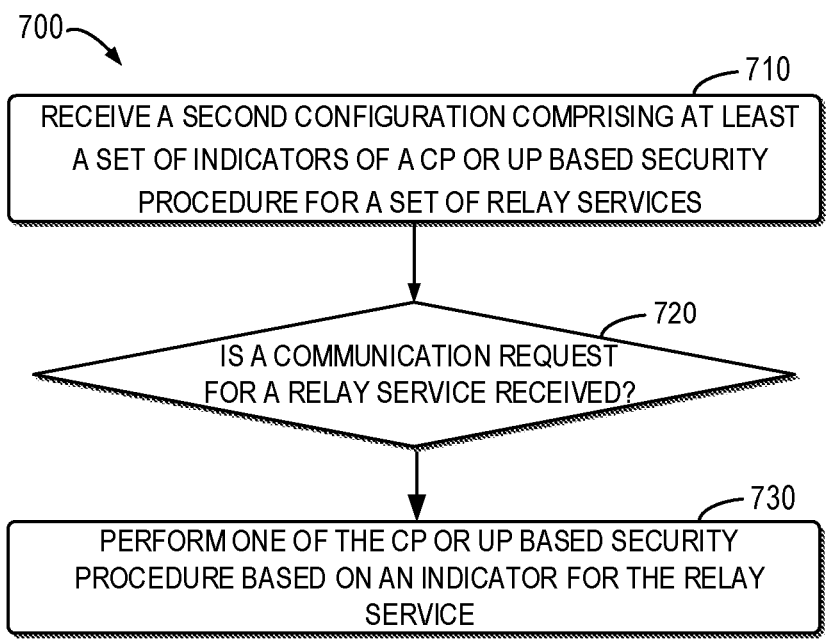
FIG. 7 illustrates a flowchart of an example method implemented at a second device as a relay UE according to some embodiments of the present disclosure.

FIG. 7 illustrates a flowchart of a method 700 implemented at a second device as relay UE according to some embodiments of the present disclosure. For the purpose of discussion, the method 700 will be described with reference to FIG. 1. It is assumed that the device 101 is remote UE and the device 103 is relay UE.

At block 710, a second device (e.g., the device 103) receives, from a fourth device (e.g., the PCF 141 serving the device 103), a second configuration comprising at least a set of indicators of a CP based security procedure or a UP based security procedure for a set of relay services.

In some embodiments, the second configuration may further comprise an indication indicating whether the at least one of the CP based security procedure and the UP based security procedure is authorized for the device 103.

In some embodiments, the fourth device may be a core network element. In some embodiments, the fourth device may be a PCF for the device 103. In some embodiments, the fourth device may be a PKMF for the device 103. In some embodiments, the fourth device may be a ProSe application server.

At block 720, the device 103 determines whether a communication request for a relay service is received from a first device (e.g., the device 101). If the communication request is received, the process 700 proceeds to block 730.

At block 730, the device 103 performs, based on an indicator for the relay service in the set of indicators, one of the CP based security procedure and the UP based security procedure for communication between the device 101 and the device 103 for the relay service.

In some embodiments, the device 103 may determine the one of the control plane based security procedure and the user plane based security procedure based on the indicator, and trigger the one of the control plane based security procedure and the user plane based security procedure.

With the method 700, an indicator of a CP based security procedure or a UP based security procedure for a relay service may be configured to relay UE. Based on the indicator, relay UE may correctly trigger a security procedure for U2N relay communication.

Figure 8:
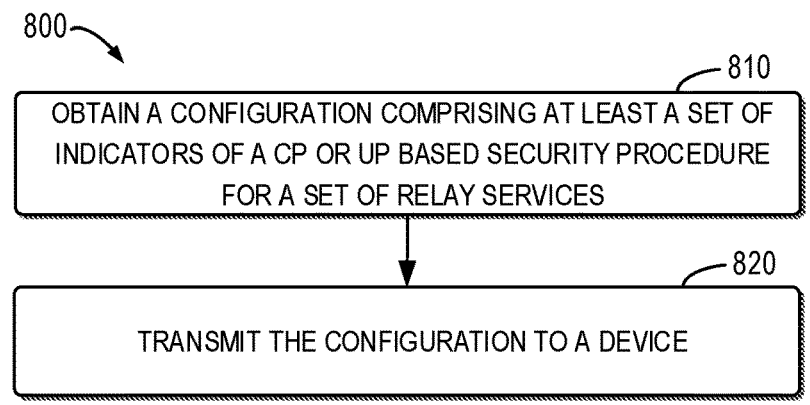
FIG. 8 illustrates a flowchart of an example method implemented at a core network element according to some embodiments of the present disclosure.

FIG. 8 illustrates a flowchart of an example method 800 implemented at a core network element according to some embodiments of the present disclosure. For the purpose of discussion, the method 800 will be described with reference to FIG. 1. It is assumed that the device 101 is remote UE and the device 103 is relay UE. The method 800 may be implemented at a core network element serving the device 101 or a core network element serving the device 103.

At block 810, the core network element obtains, from a further core network element, a configuration comprising at least a set of indicators of a CP based security procedure or a UP based security procedure for a set of relay services.

In some embodiments, the further core network element may be UDM. In some embodiments, the further core network element may be UDR. It is to be understood that the further core network element may be any other suitable core network elements.

At block 820, the core network element transmits the configuration to a device (e.g. the device 101 or 103). In some embodiments where the device is remote UE, the core network element may be a PCF or a PKMF for the remote UE. In some embodiments where the device is relay UE, the core network element may be a PCF or a PKMF for the relay UE.

In some embodiments, the configuration may further comprise an indication indicating whether the at least one of the CP based security procedure and the UP based security procedure is authorized for the device.

With the method 800, an indicator of a CP based security procedure or a UP based security procedure for a relay service may be configured to remote UE and relay UE.

Based on the indicator, remote UE and remote UE may correctly trigger a security procedure for U2N relay communication.

It is to be noted that the operations of the methods 600, 700 and 800 correspond to that of the process 500 described above, and thus other details are not repeated here for concise.

Example Implementation of Apparatus and Devices

Example embodiments of the present disclosure also provide the corresponding apparatus. In some embodiments, an apparatus (for example, a first device as remote UE) capable of performing the method 600 may comprise means for performing the respective steps of the method 600. The means may be implemented in any suitable form. For example, the means may be implemented in a circuitry or software module.

In some embodiments, the apparatus comprises: means for receiving, at a first device and from a third device, a first configuration comprising at least a set of indicators of a control plane based security procedure or a user plane based security procedure for a set of relay services; means for performing, based on the first configuration, a discovery procedure to determine a second device to relay a communication between the first device and a network for a relay service; and means for performing, based on an indicator for the relay service in the set of indicators, one of the control plane based security procedure and the user plane based security procedure for the communication between the first device and the second device for the relay service.

In some embodiments, the first configuration further comprises: an indication indicating whether the at least one of the control plane based security procedure and the user plane based security procedure is authorized for the first device.

In some embodiments, the means for performing the one of the control plane based security procedure or the user plane based security procedure comprises: means for determining the one of the control plane based security procedure and the user plane based security procedure based on the indicator; and means for triggering the one of the control plane based security procedure and the user plane based security procedure.

In some embodiments, the first device is remote user equipment, the second device is relay user equipment, and the third device is a core network element or a proximity-based service application server. In some embodiments, the core network element is a policy control function or a proximity-based service key management function for the remote user equipment.

In some embodiments, an apparatus (for example, a second device as relay UE) capable of performing the method 700 may comprise means for performing the respective steps of the method 700. The means may be implemented in any suitable form. For example, the means may be implemented in a circuitry or software module.

In some embodiments, the apparatus comprises: means for receiving, at a second device and from a fourth device, a second configuration comprising at least a set of indicators of a control plane based security procedure or a user plane based security procedure for a set of relay services; and means for performing, in response to receiving a communication request from a first device for a relay service and based on an indicator for the relay service in the set of indicators, one of the control plane based security procedure or the user plane based security procedure for a communication between the first device and the second device for the relay service.

In some embodiments, the second configuration further comprises: an indication indicating whether the at least one of the control plane based security procedure and the user plane based security procedure is authorized for the second device.

In some embodiments, the means for performing the one of the control plane based security procedure or the user plane based security procedure comprises: means for determining the one of the control plane based security procedure and the user plane based security procedure based on the indicator; and means for triggering the one of the control plane based security procedure and the user plane based security procedure.

In some embodiments, the first device is remote user equipment, the second device is relay user equipment, and the fourth device is a core network element or a proximity-based service application server. In some embodiments, the core network element is a policy control function or a proximity-based service key management function for the relay user equipment.

In some embodiments, an apparatus (for example, a core network element) capable of performing the method 800 may comprise means for performing the respective steps of the method 800. The means may be implemented in any suitable form. For example, the means may be implemented in a circuitry or software module.

In some embodiments, the apparatus comprises: means for obtaining, at a core network element and from a further core network element, a configuration comprising at least a set of indicators of a control plane based security procedure or a user plane based security procedure for a set of relay services; and means for transmitting the configuration to the device.

In some embodiments, the configuration further comprises: an indication indicating whether the at least one of the control plane based security procedure and the user plane based security procedure is authorized for the device.

In some embodiments, the further core network element is unified data management or unified data repository.

In some embodiments, the device is remote user equipment, and the core network element is a policy control function or a proximity-based service key management function for the remote user equipment.

In some embodiments, the device is relay user equipment, and the core network element is a policy control function or a proximity-based service key management function for the relay user equipment.

In some embodiments, the means comprises at least one processor; and at least one memory including computer program code; the at least one memory and computer program code configured to, with the at least one processor, cause the performance of the apparatus.

Figure 9:
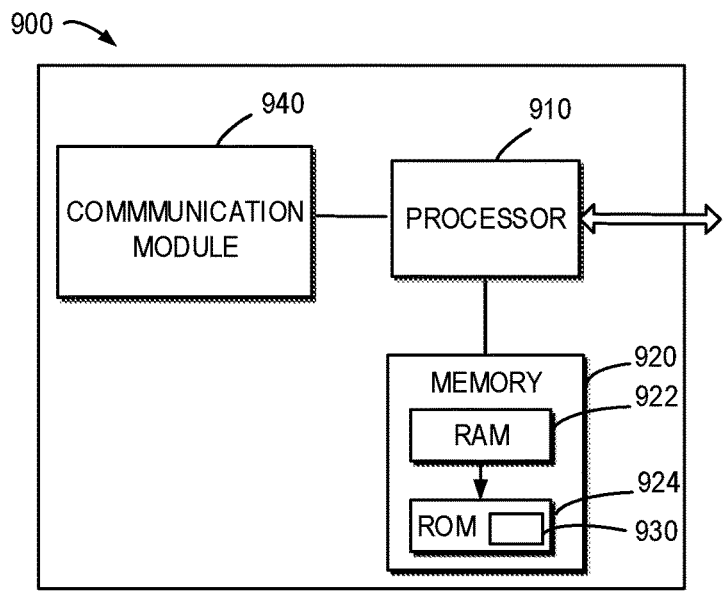
FIG. 9 illustrates a simplified block diagram of a device that is suitable for implementing embodiments of the present disclosure.

FIG. 9 is a simplified block diagram of a device 900 that is suitable for implementing embodiments of the present disclosure. The device 900 may be provided to implement the communication device, for example the devices 101 to 104, the core network elements or the ProSe application server 151 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 920. The processor 910 may perform any suitable actions and processing by loading the program 930 into the RAM 920.

The embodiments of the present disclosure may be implemented by means of the program 930 so that the device 900 may perform any process of the disclosure as discussed with reference to FIGS. 1 to 8. The embodiments of the present disclosure may also be implemented by hardware or by a combination of software and hardware.

Figure 10:
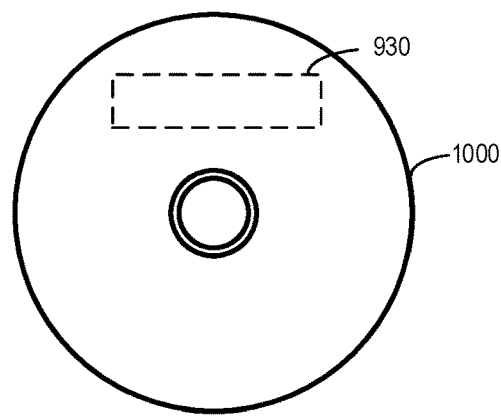
FIG. 10 illustrates a block diagram of an example computer readable medium in accordance with some embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600, 700 and 800 as described above with reference to FIGS. 6-8.

Generally, program modules include routines, programs, libraries, objects, classes, components, data structures, or the like that perform particular tasks or implement particular abstract data types. The functionality of the program modules may be combined or split between program modules as desired in various embodiments.

Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program code, the at least one memory and the computer program code configured to, with the at least one processor, cause the first device to:
perform service authorization and provisioning with a network to be authorized by the network to receive a relay service, and to receive security policies provisioned by the network including a control plane based security indicator to perform a control plane based security procedure for the relay service;
perform a discovery procedure for the relay service to select a second device for the relay service that supports the control plane based security procedure according to authorization information of the first device provisioned by the network, and a security procedure indicator of relay services announced by the second device indicating that the second device supports the control plane based security procedure; and
perform, based on the control plane based security indicator for the relay service, the control plane based security procedure to protect direct communications between the first device and the second device for the relay service;
wherein the first device is remote user equipment, the second device is relay user equipment, and the first device is provisioned with the control plane based security indicator by a core network element or a proximity-based service application server.

2. The first device of claim 1, wherein:
the control plane based security indicator is provisioned by the network in a relay service code of the relay service.

3. The first device of claim 2, wherein:
the control plane based security indicator is included in security parameters of the relay service code.

4. The first device of claim 1, wherein the core network element is a policy control function or a proximity-based service key management function for the remote user equipment.

5. A second device comprising:
at least one processor; and
at least one memory including computer program code, the at least one memory and the computer program code configured to, with the at least one processor, cause the second device to:
perform service authorization and provisioning with a network to be authorized by the network to provide a relay service, and to receive security policies provisioned by the network including a control plane based security indicator to perform a control plane based security procedure for the relay service;

perform a discovery procedure for the relay service by announcing the relay service and the control plane based security indicator indicating that the second device supports the control plane based security procedure for the relay service; and in response to receiving a communication request from a first device for the relay service, perform, based on the control plane based security indicator for the relay service, the control plane based security procedure to protect direct communications between the first device and the second device for the relay service;

wherein the first device is remote user equipment, the second device is relay user equipment, and the second device is provisioned with the control plane based security indicator by a core network element or a proximity-based service application server.

6. The second device of claim 5, wherein:
the control plane based security indicator is provisioned by the network in a relay service code of the relay service.

7. The second device of claim 6, wherein:
the control plane based security indicator is included in security parameters of the relay service code.

8. The second device of claim 5, wherein the core network element is a policy control function or a proximity-based service key management function for the relay user equipment.

9. A method of communication, comprising:
performing, at a first device, service authorization and provisioning with a network to be authorized by the network to receive a relay service, and to receive security policies provisioned by the network including a control plane based security indicator to perform a control plane based security procedure for the relay service;

performing, at the first device, a discovery procedure for the relay service to select a second device for the relay service that supports the control plane based security procedure according to authorization information of the first device provisioned by the network, and a security procedure indicator of relay services announced by the second device indicating that the second device supports the control plane based security procedure; and performing, based on the control plane based security indicator for the relay service, the control plane based security procedure at the first device to protect direct communications between the first device and the second device for the relay service;

wherein the first device is remote user equipment, the second device is relay user equipment, and the first device is provisioned with the control plane based security indicator by a core network element or a proximity-based service application server.

10. The method of claim 9, wherein:
the control plane based security indicator is provisioned by the network in a relay service code of the relay service.

11. The method of claim 10, wherein:
the control plane based security indicator is included in security parameters of the relay service code.

12. The method of claim 9, wherein the core network element is a policy control function or a proximity-based service key management function for the remote user equipment.

13. A method of communication, comprising:
performing, at a second device, service authorization and provisioning with a network to be authorized by the network to provide a relay service, and to receive security policies provisioned by the network including a control plane based security indicator to perform a control plane based security procedure for the relay service;

performing, at the second device, a discovery procedure for the relay service by announcing the relay service and the control plane based security indicator indicating that the second device supports the control plane based security procedure for the relay service; and in response to receiving a communication request from a first device for the relay service, performing, based on the control plane based security indicator for the relay service, the control plane based security procedure at the second device to protect direct communications between the first device and the second device for the relay service;

wherein the first device is a remote user equipment, the second device is a relay user equipment, and the second device is provisioned with the control plane based security indicator by a core network element or a proximity-based service application server.

14. The method of claim 13, wherein:
the control plane based security indicator is provisioned by the network in a relay service code of the relay service.

15. The method of claim 14, wherein:
the control plane based security indicator is included in security parameters of the relay service code.

16. The method of claim 13, wherein the core network element is a policy control function or a proximity-based service key management function for the relay user equipment.

* * * * *